Patented Mar. 24, 1936

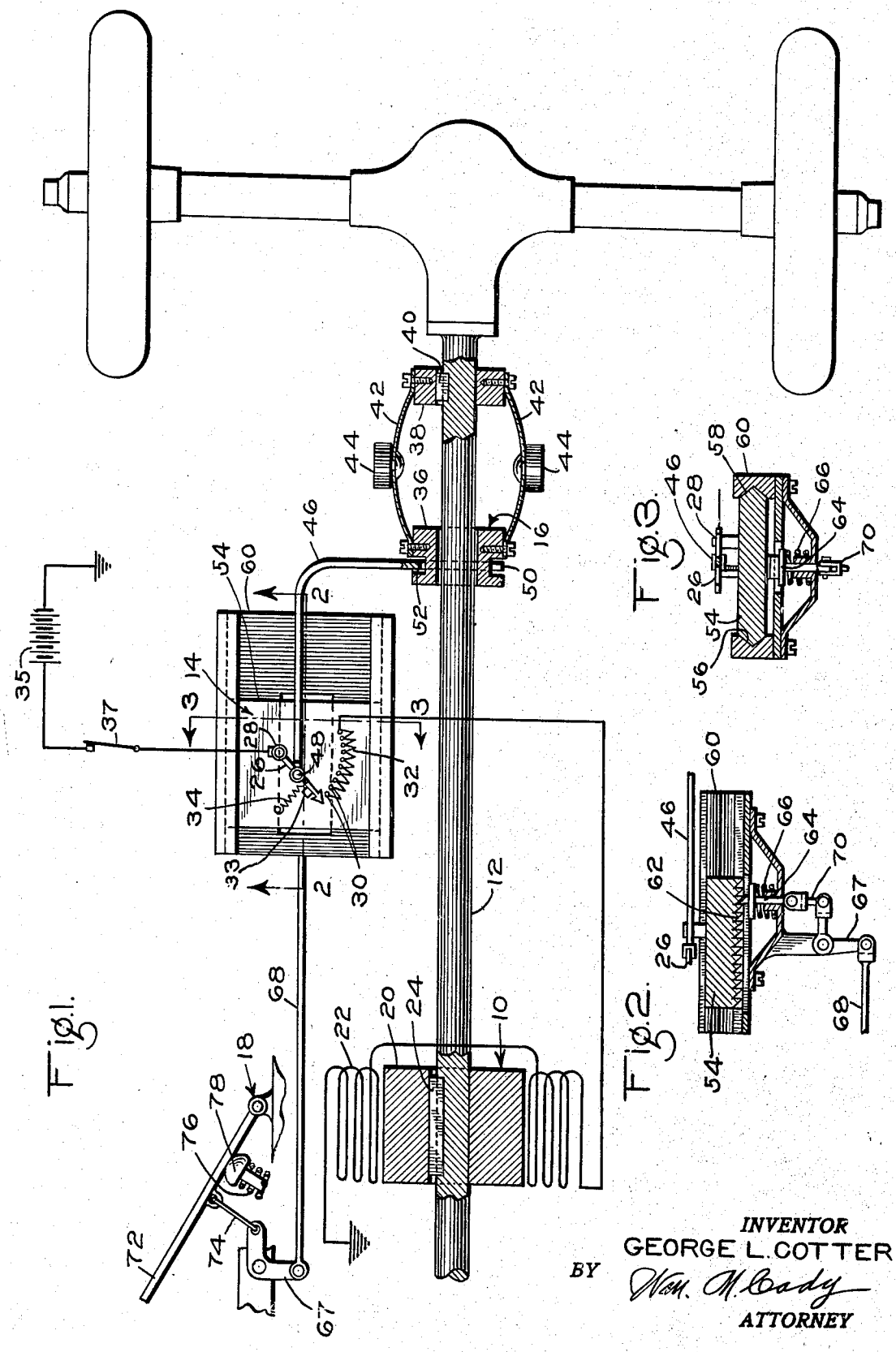

2,035,047

UNITED STATES PATENT OFFICE 2,035,047

MOTOR VEHICLE BRAKE

George L. Cotter, Wilkinsburg, Pa., assignor to The Westinghouse Air Brake Company, Wilmerding, Pa., a corporation of Pennsylvania Application February 17, 1934, Serial No. 711,693

6 Claims. (Cl. 188—181)

This invention relates to motor vehicle brakes, and more specifically to brakes for controlling the overspeed of vehicles.

When descending a grade in a motor vehicle, it is usually necessary to apply the brakes in order to maintain a desired rate of speed. Whether the approach to the grade is made at a high or a low speed, some degree of skill on the part of the operator must be exercised in applying the brakes to prevent the vehicle from reaching dangerous speeds. If during the descent the engine remains clutched to the driving shaft, it will produce an effective retarding force, thereby requiring less force at the brakes. If, however, the vehicle is equipped with a so-called "free wheeling" device, or some other similar overspeed device, the retarding effect of the engine may not be present, and the brakes must be applied with a greater force.

It is usually desirable that the speed of approach to a grade be maintained during the descent of the grade, and if this could be accomplished without requiring some skill on the part of the operator, it would greatly add to the comfort and ease of driving. With this in mind, I contemplate as one object of my invention, the provision of a motor vehicle brake which acts automatically to prevent overspeeds in excess of that desired, as determined by manual operation of the throttle.

Another object of my invention is to provide a motor vehicle brake in which the braking effect produced is proportional to the overspeed of the vehicle.

A yet further object is to provide a vehicle brake of this character which is adaptable not only to the braking of overspeeds of a motor vehicle, but which is also adaptable to the braking of overspeeds on any type of vehicle, such for example as traction and railway vehicles.

Yet further objects and advantages of my invention will be apparent from the following description, which is taken in connection with the attached drawing, in which Figure 1 is a schematic arrangement of apparatus comprising one embodiment of my invention for adaptation to a motor vehicle.

Figure 2 is a view along the line 2—2 of the rheostat device shown in Figure 1.

Figure 3 is a similar view along the line 3—3 of the same device.

Referring now to the drawing, I have provided an electro-dynamic brake device 10 of the eddy current type, associated with a drive shaft 12 of an automobile, a rheostat device 14 and a centrifuge device 16, for controlling operation of the brake device, and a throttle mechanism 18 having means associated therewith for controlling operation of the rheostat device.

The brake device 10 may be of any of the usual electro-dynamic types, and I have, as one example, indicated a simple form of the eddy current type comprising a rotor 20 and a stator 22.

The rotor 20 is preferably an annulus of some magnetic material, such, for example, as iron or steel, secured to the automobile drive shaft 12, as by a key 24. The stator 22 is shown diagrammatically as comprising insulated windings arranged to form magnetic poles adjacent the periphery of the rotor.

It is to be understood, however, that instead of the simple form diagrammatically shown I may use an eddy current brake in which the stator is provided with any desired number of projecting poles on which are disposed exciting windings; and, if desired, a rotor having either a squirrel cage type of winding, or an insulated winding disposed thereon.

The rheostat device 14 is provided with a movable arm 26, which is pivotally mounted at 28 and adapted to be moved into successive engagement with contacts 30 between which are connected segments of a resistance unit 32. The arm 26 is held in an "off" position, out of engagement with the contacts 30, by a spring 34, against a stop 33.

When the movable arm 26 is moved into engagement with the contacts 30, the stator winding of the eddy current brake device 10 is energized from a source of current supply, such for example, as a battery 35. The degree of energization depends upon the amount of the resistance unit 32 connected in the circuit. A switch 37 may be provided in the circuit for disconnecting the battery at any desired time, independently of operation of the movable arm 26.

The movable arm 26 is adapted to be operated by the centrifuge device 16. The centrifuge device is provided with two collar members 36 and 38. The collar 38 is rigidly secured to the drive shaft 12, as by a key 40. The collar member 36 is axially slidable on the drive shaft 12, and is connected to the relatively stationary collar 38 by resilient and flexible members 42.

Intermediate the ends of these flexible members 42 are secured weights or bodies 44. When the drive shaft 12 is rotated, the centrifugal force due to rotation of the bodies 44 will cause the collar 36 to be slid axially to the right, and this movement will be transmitted to the movable arm 26 through a connecting rod 46.

The connecting rod 46 has one end thereof secured to the movable arm at 48, and the other end thereof provided with a forked portion 50 interfitting with a slot 52 in the slidable collar 36.

The centrifuge device is intended to operate the movable arm 26 for overspeeds of the vehicle only. To prevent the arm from being operated at other times I have provided a mechanism which is operable from the throttle mechanism 18. The rheostat device 14 is provided with a base member 54 having beveled edges 56 providing for support of the base member in a coacting slot or recess 58 in a supporting structure 60. The under surface of the base member 54 is provided with a series of notches or teeth 62. Supported from the underside of the structure 60 is a latch 64, which is urged upwardly into engagement with the teeth 62 by a spring 66.

When the latch 64 is out of engagement with the teeth 62, the base member 54 is slidable in the supporting structure 60. When the latch 64 is in engagement with the teeth 62, the base member 54 may be moved to the left in the supporting structure 60, but the vertical edges of the teeth 62 prevent movement to the right.

For operating the latch 64 into and out of engagement with the teeth 62, I have provided a link mechanism comprising bell crank levers 67, connecting rod 68, and link 70. This mechanism is adapted to be actuated by a throttle foot pedal 72, through a link member 74.

When the foot pedal 72 is depressed the latch 64 is disengaged from the teeth 62, but so long as the foot pedal is in its uppermost position the latch 64 remains in engagement with the teeth. A spring 76 acts upon a pin 78, which may be associated with the carburetor or other fuel regulating device, to position the foot pedal in its uppermost position.

In operation, the operator depresses the foot pedal 72 to effect a supply of fuel to the engine, in accordance with the rate of speed desired. This downward movement of the foot pedal causes the latch 64 to be disengaged from the teeth 62.

As the vehicle accelerates, the centrifugal force due to rotation of the bodies 44 about the shaft 12, will cause the collar 36 to move to the right. This movement of the collar will exert a pull on the rheostat arm 26. With the latch 64 disengaged from the teeth 62, the spring 34 is of sufficient strength to hold the arm 26 against its stop 33, so that the result of this pull on the arm 26 is to move the entire rheostat device 14 to the right, it sliding in the recessed trackway 58 of the supporting structure 60, instead of merely moving arm 26 away from stop 33 and over the contacts 30.

With the whole rheostat device moved to the right, the rheostat arm 26 is thus held out of engagement with the contacts 30, so that the stator winding of the brake device 10 is as yet not energized. The rheostat device 14 will then be positioned so that latch 64 will be adjacent the left hand portion of the teeth 62.

If now the vehicle begins to descend a grade and it is desired to prevent overspeeds, the operator removes pressure on the foot pedal 72, permitting it to return to its uppermost position. This movement of the foot pedal permits the latch 64 to reengage the teeth 62 with the rheostat device 14 in the position corresponding to the speed at which the vehicle is travelling at the time the pressure on the foot pedal is released. The rheostat device is then locked in position against further movement to the right, but due to the slope of the teeth 62 may be moved to the left.

As the vehicle descends the grade it will tend to overspeed, and as it does so the bodies 44 will move further outwardly, causing the collar 36 to exert a greater pull on the rheostat arm 26. Since the rheostat base member 54 is locked against further movement to the right, this pull will move the rheostat arm into engagement with the contacts 30, whereupon the stator winding of the brake device will be energized.

When current flows in the stator winding, a magnetic flux is produced which enters the rotor 20. Since the rotor 20 is rotating with movement of the vehicle, eddy currents will be generated therein and these currents will in turn produce a magnetic flux counter to that produced by the stator winding, with the result that a retarding or braking force will be produced. This retarding force acts to prevent the vehicle from accelerating while descending the grade.

In case the initial retarding force due to energization of the brake is insufficient to prevent acceleration, any increase in speed of the vehicle will cause a further movement of the rheostat arm 26 to the right, whereupon resistance will be cut out of circuit and a greater current will flow in the brake stator winding. The retarding force produced by the brake device is directly proportional to the stator current, hence the retarding force produced by the brake device is directly proportional to the overspeed of the vehicle.

After the vehicle has descended the grade and again travels on level roadway, and no pressure is exerted on the foot pedal, the speed of the vehicle will diminish, causing the collar 36 of the centrifuge device to move to the left. This movement will first return the rheostat arm 26 to its "off" position, and further movement will move the entire rheostat device toward its "no speed" position.

It will be seen, therefore, that this arrangement will not interfere with drifting of the car unless there is a tendency to pick up speed, at which time the apparatus functions to prevent the speed from increasing. The limit of the speed is established at the time the foot pedal is permitted to assume its "off" position. Any slowing down of the car after that time automatically reduces the speed limit, which can be raised only by again depressing the foot pedal.

If at any time after releasing pressure on the foot pedal it is desired to permit the car to drift to overspeeds, the switch 37 may be opened, whereupon the brake is entirely ineffective.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle brake apparatus, in combination, an auxiliary brake device, control means for effecting operation of said brake device, means operated according to the speed of the vehicle for actuating said control means, a control element having a biased position and operable to other positions to effect a speed of the vehicle according to the degree of movement thereof, and means for preventing said speed controlled means from actuating said control means when said element is in said other positions but permitting said speed controlled means to actuate said control means when said element is in said biased position.

2. In a vehicle brake apparatus, in combination, an electric brake device, a source of current supply, a circuit for connecting said source to said brake device, a circuit controller device having normally open contacts in said circuit, a centrifuge device for closing said contacts, a control element having idle and active positions, and means for preventing said centrifuge device from effecting closing of said contacts when said control element is in an active position but operable to permit closing of said contacts by said centrifuge device when said element is in said idle position.

3. In a vehicle brake apparatus, in combination, an electric brake device, a stationary member, a movable member carried by said stationary member and movable with respect thereto, normally open contacts carried by said movable member, a control element having an idle position and an active position, locking means for locking said stationary and movable members against relative movement in a certain direction, a centrifuge device operable to close said contacts when said members are locked, and means for unlocking said members when said element is in said active position to prevent closing of said contacts by said centrifuge device.

4. In a vehicle brake apparatus, in combination, an auxiliary brake device, a control element having an idle position and movable to different operative positions to effect a speed of the vehicle in accordance with the degree of movement thereof, means for preventing operation of said brake device when said control element is in any operative position, and means rendered operative upon movement of said control element to said idle position for effecting operation of said brake device to a degree corresponding to the overspeed of the vehicle above that effected by movement of said control element to operative position.

5. In a vehicle brake apparatus, in combination, an electric brake device, a source of current, a circuit for connecting said brake device to said source, a rheostat device for controlling the degree of current supplied to said brake device, a control element having an idle position and movable to an operating position to effect propulsion of the vehicle at a chosen speed, centrifuge means for operating said rheostat to effect a supply of current to said brake device in accordance with the overspeed of said vehicle above said chosen speed, and means for preventing operation of said rheostat by said centrifuge means until said control element is returned to said idle position.

6. In a vehicle brake apparatus, in combination, an electric brake device, a pair of members providing for relative movement therebetween, means for effecting operation of said brake device to a degree according to the degree of relative movement between said members, means operated according to the speed of the vehicle for moving one of said members, a control device having an idle position and an operating position, and means for preventing relative movement of said members when said control element is in said active position but permitting relative movement when said control element is in said idle position.

GEORGE L. COTTER.